2,519,059

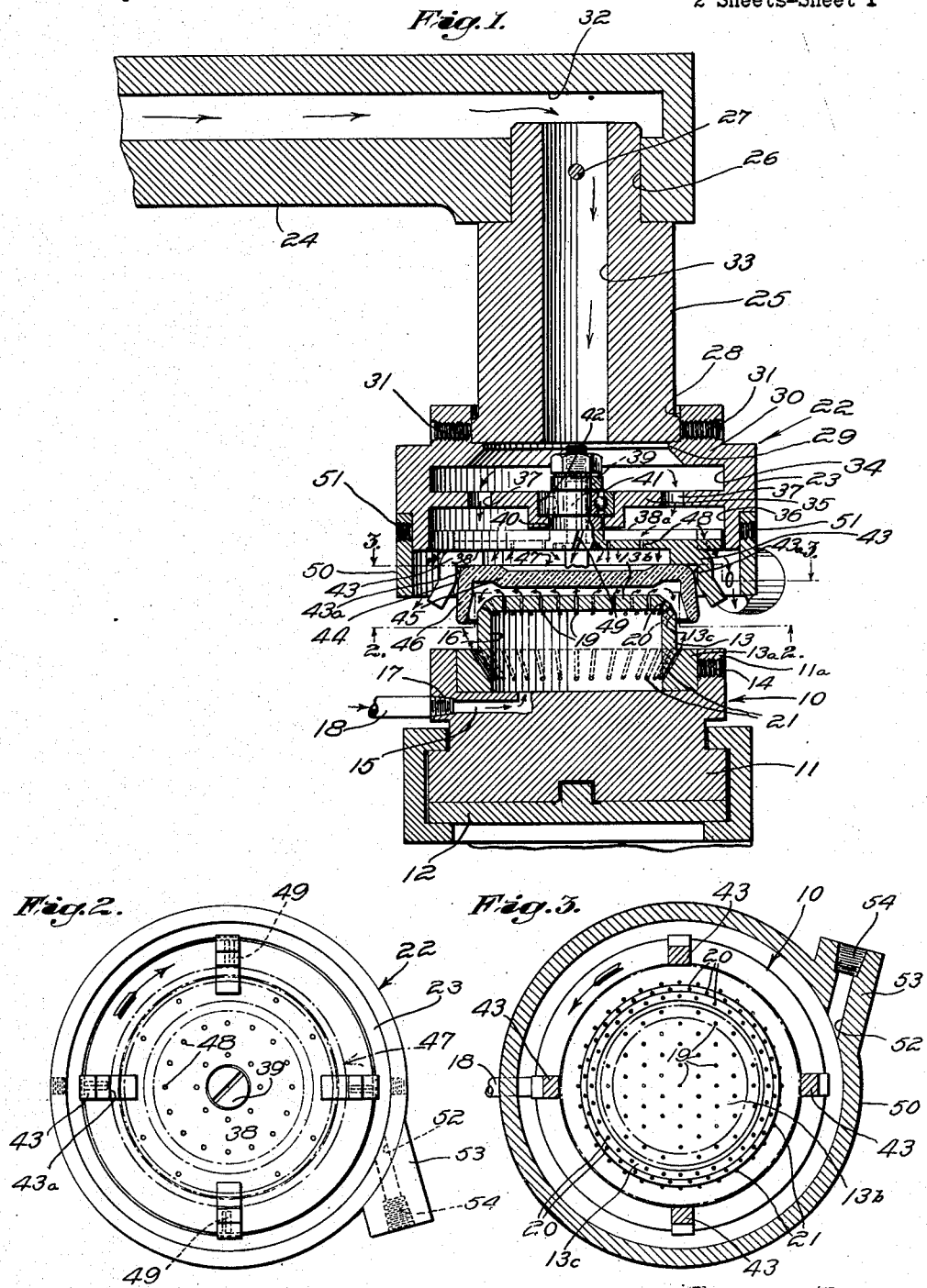
Aug. 15, 1950 — H. C. MacCONNELL, JR — 2,519,059
APPARATUS FOR AND METHOD OF COOLING GLASS ARTICLES
Filed Sept. 10, 1943 — 2 Sheets-Sheet 1
Inventor
Hugh C. MacConnell Jr.
by Brown & Parham
Attorneys Patented Aug. 15, 1950

UNITED STATES PATENT OFFICE 2,519,059

APPARATUS FOR AND METHOD OF COOLING GLASS ARTICLES

Hugh C. MacConnell, Jr., West Hartford, Conn., assignor to Hartford-Empire Company, Hartford, Conn., a corporation of Delaware Application September 10, 1943, Serial No. 501,833

12 Claims. (Cl. 49—45)

1

This invention relates to improvements in apparatus for and methods of applying cooling fluid to the surfaces of glass articles, especially those, such as container closure caps, which have shallow, open cavities therein, to effect tempering of the articles.

An object of the present invention is to improve glass article cooling apparatus of the kind which has means for blowing a cooling fluid, usually air, upwardly against the under surface of a hot glass article so that the cooling fluid serves also as a fluid undersupport for the article. Such apparatus may include a means for discharging cooling fluid upon the portions of the surface of the article not reached by the upwardly directed cooling fluid. One such apparatus is disclosed in Patent No. 2,284,796, of June 2, 1942, to W. K. Berthold.

A further object of the invention is to provide an improved method of cooling glass articles of the character described so as to temper them in such a way and by such means as to assure substantially like conditions of strain throughout all corresponding portions of the tempered article.

According to the present invention, the hot glass article to be tempered is caused to spin or rotate about its vertical axis while it is being cooled and supported by upwardly directed cooling fluid from an underneath source and also is being cooled by downwardly directed cooling fluid from an overhead source. The spinning or rotation of the article about its vertical axis may be effected by part of the cooling fluid and it is an object of the invention to provide simple, reliable and effective means for and a novel way of utilizing cooling fluid to accomplish this result.

Further objects of and advantages of the invention will be pointed out or will become apparent from the following description of illustrative practical embodiments of the invention, as shown in the accompanying drawings, in which:

Figure 1 is a view, mainly in vertical section and fragmentary in part, showing one form of apparatus, having upper and lower spaced cooling fluid discharge units for applying cooling fluid to an interposed glass cap to cool the latter while it rests upon cooling fluid from the lower discharge unit and is rotated about its vertical axis by cooling fluid from the upper discharge unit;

Fig. 2 is a view substantially along the line 2—2 of Fig. 1, looking upward as indicated by the arrows;

Fig. 3 is a section along the line 3—3 of Fig. 1;

2

Figure 4:
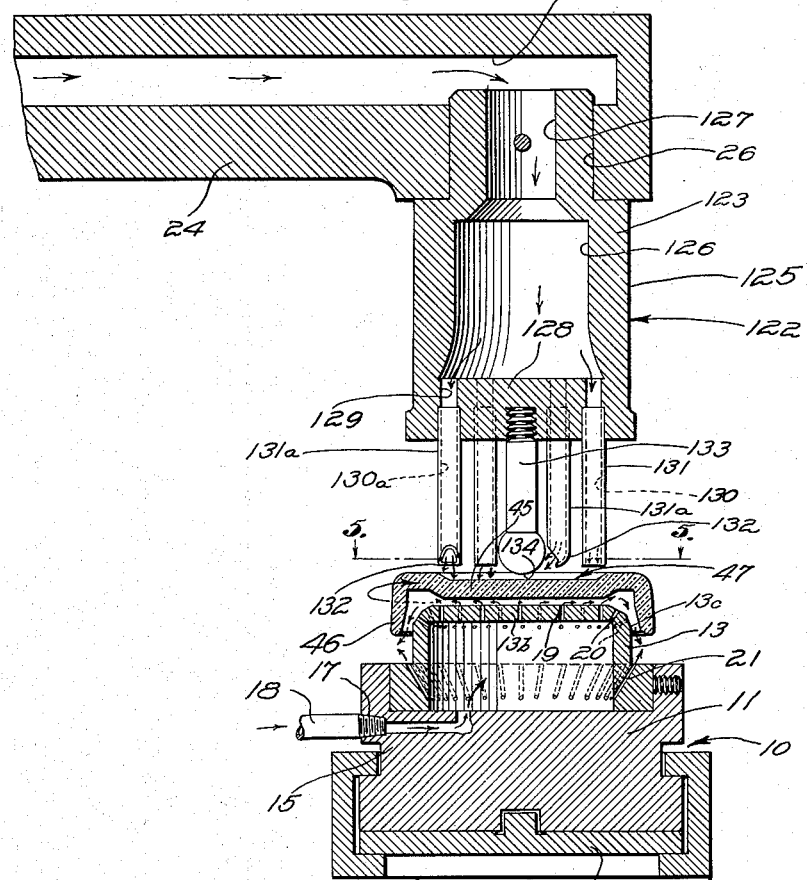
Fig. 4 is a view similar to Fig. 1, showing a second form of apparatus having upper and lower fluid discharge units for cooling and rotating an interposed glass cap.

In the apparatus shown in Fig. 1, the lower fluid discharge or blowing unit, indicated generally at 10, comprises a base block 11, mounted upon a support 12, and carrying an upstanding or upwardly projecting hollow fluid discharge or blowing head 13. The head 13 might be integral with the base block 11 but is shown as having been formed as a separate member having an externally enlarged lower end portion 13a fitting within a recessed upper portion 11a of the base block and held therein by suitable fastening means, such as the set screw 14. The head 13 has a substantially flat top portion 13b and may be rounded or curved more or less arcuately, as at 13c, at the juncture of its top portion with its side wall.

A passage 15 in the base block is in open communication at its inner end with a chamber 16 within the head 13. The outer end portion of the passage 15 may be screw threaded for connection, as at 17, with a screw threaded end portion of a cooling fluid supply pipe 18. The blowing head 13 may be provided with fluid discharge orifices or jet holes of a number, size or sizes, and locations deemed appropriate for the purpose intended. As shown, Figs. 1 and 3, vertical jet holes 19 are provided at closely spaced intervals throughout the flat top portion 13b, upwardly and outwardly inclined jet holes 20 are provided in the rounded upper corner portion 13c, and other upwardly and outwardly inclined jet holes 21 are provided through the externally enlarged lower end portion 13a of the body of the blowing head.

The upper fluid discharge or blowing unit, indicated generally at 22 in Fig. 1, comprises a hollow blowing head 23, a hollow horizontal supporting arm 24, and a vertical tubular connector 25 by which the head 23 is suspended from the supporting arm. As shown, the upper end portion of the tubular connector fits closely within a vertical opening 26 in the bottom wall of the hollow arm 24, which is closed at its adjacent free end, and a suitable fastening device, such as the pin 27, fastens the arm and connector together. The lower end portion of the tubular connector 25 fits within a counterbored upper portion 28 of a central opening 29 in the top wall 30 of the hollow head 23 and fastening devices, such as the set screws 31, prevent accidental or unintended separation of the head from the connector. By this arrangement, the internal passage 32 of the arm 24 communicates through the bore 33 of the connector 25 with a chamber 34 in the upper part of the head 23.

A transversely extending horizontal plate 35 in the hollow head 23 divides the interior of the latter into the upper chamber 34 and a lower chamber 36. These chambers may, however, be continuously in communication with each other through openings 37 in the plate 35 so that they may be considered in effect as portions of the same chamber. The plate 35 is shown as being integral with the side wall of the head 23 around the inner periphery of the latter, but it obviously may have been formed as a separate member and secured in the desired location in the hollow head in any suitable known way.

The hollow head 23 has a circular fluid discharge or blowing bottom plate 38 which may be rotatably supported within the lower portion of the head by being provided with an upstanding central axle or stem 39 projecting vertically through a central opening 40 in the plate 35 and being anti-frictionally supported at 41 in a counterbore 42 at the upper end of the central opening 40.

The bottom plate 38, which may be provided with an upstanding annular flange 38a at its periphery, fits within the lower portion of the hollow blowing head 23 closely enough to prevent escape of any substantial amount of fluid under pressure between these parts although not closely enough to prevent easy rotation or spinning of the plate 38 about its vertical axis. The portion of the hollow blowing head 23 directly surrounding the plate 38 is of course of circular cross-sectional configuration at its interior to permit the rotation of the plate 38.

The plate 38 is provided at its lower side with a plurality of angularly spaced lugs or fingers 43. These are shown to be four in number. They are located equi-distant from the axis of rotation of the plate 38 and are spaced radially from that axis a sufficient distance to contact with the angular portion 44 at the juncture of the top 45 and the depending skirt 46 of a glass cap, generally designated 47, when that cap is disposed in a raised position, with its skirt turned downward and its top portion within the confines of the lugs or fingers 43, as shown in Fig. 1. The lugs or fingers 43 are shown as being integral with the plate 38 and as shaped to provide angular recesses 43a at their lower and inner sides for the accommodation of the top portion of the glass cap, as aforesaid. These lugs or fingers may of course be formed separately from the plate 38 and fastened thereto in any suitable known way.

The plate 38 is provided with outlets in the form of jet holes 48 of a number, size or sizes and relative locations deemed appropriate or best suited for the operation intended. In addition to the jet holes 48, the plates 38 may be provided with other outlets in the form of inclined slots 49 which are spaced angularly around the axis of rotation of the plate 38 and are located at a substantial radial distance from that axis. The inclination of the slots 49 is such that the fluid under pressure passing downwardly therethrough will spin or rotate the plate 38 in one direction about its axis, as in a clockwise direction when viewed from below, as shown in Fig. 2. Of course, when the cap is in a raised position against the lugs or fingers 43, as shown in Fig. 1, its frictional contact with these fingers will cause the cap to rotate in unison with the rotating plate 38.

The blowing head 23 has a depending annular skirt 50, extending to a level below the glass cap engaging portions of the depending lugs or fingers 43 and thus well below the upper surface of the glass cap 47 when the latter has been raised against these lugs or fingers. This skirt is shown as having been formed separately from and fastened to the main part of the blowing head 23, as by set screws 51. It may be integral with the main part of the blowing head. It serves to confine downwardly moving cooling fluid from the outlets of the plate 38 laterally around the glass cap. It is provided with a passage 52 in an outwardly enlarged portion 53 of the wall thereof, this passage being directed tangentially of the glass cap when the latter is in its raised portion beneath the rotary plate 38, as shown in Fig. 1. The outwardly enlarged portion 53 is adapted, as by being internally screw threaded at 54 at the outer end portion of the passage 52, for connection with a supply pipe (not shown) for directing air under pressure through the passage 52 tangentially against the cap and against the depending lugs or fingers on the plate 38 in the direction to oppose the rotation of the cap and its associate plate 38.

In practice, the cooling apparatus just described may be associated with a suitable forming machine for producing the glass articles to be tempered and for delivering the hot glass articles produced to the lower cooling fluid discharge unit, substantially as disclosed in the aforesaid Berthold Patent 2,284,796. In such an operating set-up, the hollow arm 24 may be supported and operated and supplied at the desired times with air under pressure substantially as in the case of the blow head supporting arm 19 of the modified Hartford I. S. Forming Machine shown in Fig. 1 of the aforesaid Berthold patent. The lower blowing unit 10 and the passage 52 in the skirt of the upper blowing head may be supplied with cooling fluid at the proper times by the cooling fluid supply mechanism of this Hartford I. S. Machine.

Starting with the delivery to the lower blowing unit of a glass cap at a suitably high temperature, as by transfer mechanism substantially as disclosed in the aforesaid Berthold patent or in any other suitable known manner, a typical operation may be substantially as follows. Discharge of upwardly directed cooling fluid from the jet holes of the lower blowing head may be started immediately before, simultaneously with, or shortly after the delivery of the glass cap to the lower blowing head. The upper blowing unit is brought to an operative position above and in line with the lower blowing unit, as to the position shown in Fig. 1, as soon as practicable after the delivery of the glass cap to the lower blowing unit. Cooling fluid directed upwardly from the jet holes of the lower blowing head will support the cap out of contact with the lower blowing head. The height above the latter at which the cap will be fluidly undersupported may be limited by the lugs or fingers 43 on the plate 38. These, by contact with the top of the cap at angularly spaced places, may keep the cap in centered relation both with the rotary plate 38 and with the underneath lower blowing head 13.

Discharge of cooling fluid from the upper blowing head through the jet holes 48 and the inclined slots 49 is started when the upper blowing head is in its operative position. The fluid under pressure passing downwardly through the inclined slots 49 will, as previously indicated, cause spinning or rotation of the plate 38 about its axis. This will cause a like spinning or rotation of the cap when the latter has been raised by cooling fluid from the lower blowing head into frictional contact with the lugs or fingers 43 on the lower side of the plate. The rotation of the cap has the advantageous effect of distributing better the cooling action of the cooling fluid throughout the surfaces of the cap, particularly at the portions thereof cooled by fluid from the lower blowing head. The tempered lid or other like glass article thus will have substantially the same temper at corresponding portions thereof, as throughout the angularly different portions of the skirt and of the corner wall of the cap. The cap, as a whole, will show a satisfactory temper when viewed in a polariscope. The strain pattern of the lid or top portion of the cap is substantially uniform, instead of having a spotted design as sometimes noted in similar articles which have been cooled and supported by jets of air but have not been rotated during cooling.

In order quickly to stop the rotation or spinning of the cap, after discharge of the cooling fluid from the upper blowing head has been stopped, air under pressure may be supplied through the passage 52 in the skirt of the upper blowing head tangentially against the periphery of the cap and against the lugs or fingers 43 so as to oppose and stop the rotation of the cap. This fluid braking means is effective to stop the free spinning of the cap without causing any injury to it. Prompt removal of the cap from the lower blowing unit then may be effected by hand operated tongs or by any suitable transfer mechanism, none being shown.

Figure 5:
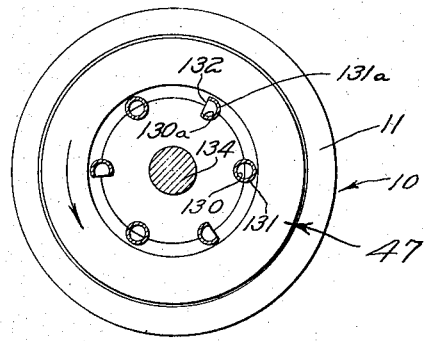
Fig. 5 is a section along the line 5—5 of Fig. 4.

In the form of cooling apparatus shown in Figs. 4 and 5, the same lower blowing unit 10 may be used. The supporting arm 24 of the upper blowing unit also may be used. The upper blowing unit, now indicated at 122, comprises a hollow blowing head 123 having a tubular stem or connector portion 125 provided with an upper end portion secured in the opening 26 in the bottom wall of the arm 24, as in the case of the cooling apparatus previously described. The blowing head 123 has a chamber within it, indicated at 126, in open communication at its top with the bore 127 of the connector 125 and thence with the passage 32 in the supporting arm 24.

The blowing head 123 has a bottom plate 128 provided with outlets for the downward discharge of cooling fluid. As shown, these outlets comprise vertical passages 129 in the plate 128 and the bores 130 and 130a of short vertical tubes 131 and 131a which have their upper end portions fitting within the passages 129. The tubes 131a have their lower end portions formed, as indicated at 132, to direct the fluid discharging therefrom against the upper surface of the glass cap 47 at directions inclined from the vertical and oblique to radii of the glass cap so as to spin or rotate the latter about its own vertical axis. The bores 130 of the tubes 131 may be straight at their lower ends so that the cooling fluid therefrom will be discharged in a straight downward direction.

The extent of upward movement of the cap 47 by the supporting cooling fluid from the lower blowing head may be limited by a stop member 133 carried by and depending from the bottom plate 128 at the center of the latter. As shown, this stop member 133 has a convexly curved or rounded contact surface 134 at its lower end, which is located slightly below the level of the discharge ends of the tubes 131 and 131a. Should the glass cap 47 be raised by the supporting cooling fluid from the lower blowing head against this rounded stop member, it will afford a practically frictionless bearing for the head of the cap at the center of the latter. It will be understood that the rotation or spinning of the cap may be effected either with or without contact of its head with the stop member, according to whether the supporting cooling fluid from the lower blowing head is effective to raise the cap against the stop member or to only a lower level.

The operation of the form of apparatus shown in Fig. 4 will be readily understood. Each cap or other glass article, at a suitably high temperature, may be delivered to the lower blowing unit in any suitable known manner. The upper blowing unit will be brought to operative position above and in line with the lower blowing head, as shown in Fig. 4, as soon as practicable. Concurrent cooling of the external and internal surfaces of the cap, attended by spinning or rotation of the cap about its vertical axis, will then be effected in the manner and with the beneficial results hereinbefore pointed out. On completion of cooling of the cap, the upper blowing unit be removed by the usual operation of the supporting arm 24 and the cap then may be removed from the lower blowing unit in any suitable known manner.

Various modifications of and changes in the illustrative embodiments of the invention shown in the accompanying drawings and herein described and in the methods of the invention as herein described will readily occur to those skilled in the art and I therefore do not wish to be limited to the details of such illustrative embodiments and methods.

I claim:

1. Apparatus for cooling hot glass articles comprising an upwardly facing cooling fluid discharge head, a downwardly facing cooling fluid discharge head located above and spaced from said first named head, said first named head being provided with discharge outlets for directing jets of cooling fluid upwardly so as to support a hot glass article to be cooled on said jets beneath the second named head, said second named head having discharge outlets for directing cooling fluid downwardly toward the thus supported hot glass article, certain of said outlets of said second named head being formed to direct cooling fluid in a direction to cause rotation of the article about its vertical axis.

2. Apparatus for cooling hot glass articles comprising an upwardly facing cooling fluid blowing head, a downwardly facing cooling fluid blowing head located above and in spaced relation with said first named head, said first named head having upwardly directed discharge outlets for discharging cooling fluid upwardly against the under surface of a hot glass article to support the latter above and out of contact with said first named blowing head, said downwardly facing blowing head comprising a rotary plate having outlet openings formed therein for directing cooling fluid downwardly toward said glass article, and also having outlet openings inclined from the vertical so that downward discharge of fluid therefrom will cause rotation of said rotary plate about its vertical axis, and spaced glass contacting elements on the underside of said rotary plate for contacting with the glass article at places spaced angularly about its vertical axis to rotate said glass article about its said axis.

3. Apparatus for cooling hot glass articles comprising an upwardly facing hollow cooling fluid blowing head, a downwardly facing cooling fluid blowing head located above and in spaced relation with said first named head, said first named head having upwardly directed discharge outlets for discharging cooling fluid upwardly against the under surface of a hot glass article to support the latter above and out of contact with said first named blowing head, said downwardly facing blowing head comprising a rotary plate having outlet openings formed therein for directing cooling fluid downwardly onto said glass article, and also having outlet openings inclined from the vertical so that downward discharge of fluid therefrom will cause rotation of said rotary plate about its vertical axis, spaced glass contacting elements on the underside of said rotary plate for contacting with the glass article at places spaced angularly about its vertical axis to rotate said glass article about its said axis, and means for applying fluid under pressure to the periphery of said glass article in a direction to oppose the rotation of said article, caused by the discharge of fluid from said inclined outlet openings.

4. Apparatus for cooling hot glass articles comprising an upwardly facing hollow blowing head provided with spaced jet holes for discharging jets of cooling fluid against the inner surface of a glass cap, or like glass article, to support said article upon said jets, a downwardly facing blowing head located above and in line with said upwardly facing blowing head, said downwardly facing blowing head having a rotary member having spaced jet holes for discharging jets of cooling fluid onto said article, and also having jet holes formed to direct jets of fluid downwardly in directions inclined from the vertical, said downwardly facing blowing head having a depending annular skirt surrounding said rotary member and extending below the level of the upper portion of said article, said skirt having a passage formed therein for directing fluid under pressure against the periphery of said glass article substantially tangentially thereof.

5. Apparatus for cooling hot glass articles comprising an upwardly facing hollow blowing head formed with spaced jet holes in the wall thereof for directing jets of cooling fluid upwardly against a hot glass article to support said article on said jets out of contact with said blowing head, a downwardly facing hollow blowing head located above and in line with said first named blowing head, said last named blowing head having spaced outlets for directing cooling fluid downwardly upon the hot glass article when the latter is supported by the jets from said first named blowing head, said outlets comprising passages in short vertical tubes depending from the downwardly facing blowing head, certain of said tubes being formed at their lower ends to direct cooling fluid discharging therefrom against said glass article in directions inclined from the vertical and such as to cause rotation of the glass article about its vertical axis.

6. Apparatus for cooling hot glass articles comprising an upwardly facing hollow blowing head formed with spaced jet holes in the wall thereof for directing jets of cooling fluid upwardly against a hot glass article to support said article on said jets out of contact with said blowing head, a downwardly facing hollow blowing head located above and in line with said first named blowing head, said last named blowing head having spaced outlets for directing cooling fluid downwardly upon the hot glass article when the latter is supported by the jets from said first named blowing head, said outlets comprising passages in short vertical tubes depending from the downwardly facing blowing head, certain of said tubes being formed at their lower ends to direct cooling fluid discharging therefrom against said glass article in directions inclined from the vertical and such as to cause rotation of the glass article about its vertical axis, and a stop member depending from said downwardly facing blowing head and having a rounded lower end surface located at a level slightly below the lower ends of said outlet tubes and above the center of said glass article.

7. The method of cooling hot glass articles which comprises applying cooling fluid to such an article so as to support the article by the cooling fluid and rotating the article about its vertical axis while it is thus supported.

8. The method of cooling hot glass articles which comprises applying upwardly directed jets of air to such an article so as to support the article at its under surface on said jets and rotating the article about its vertical axis while it is thus supported.

9. The method of cooling hot glass articles which comprises applying cooling fluid to such an article so as to support the article at its under surface by the cooling fluid, rotating the article about its vertical axis while it is thus supported and applying additional cooling fluid to said article.

10. The method of cooling hot glass caps and similar articles, which comprises discharging jets of a cooling fluid upwardly against the internal surface of such an article to support the article by said jets, applying jets of cooling fluid downwardly upon the thus supported article, and rotating said article about its vertical axis during the application of said jets thereto.

11. The method of cooling hot glass caps and similar glass articles which comprises directing jets of cooling fluid under pressure upwardly against such an article to cause the article to be supported by said jets, applying other jets of cooling fluid to the thus fluidly supported article to cool the portion of the surface thereof not cooled by said first named jets, and applying inclined jets of fluid under pressure to said fluidly supported article to cause rotation of the article about its vertical axis.

12. The method of cooling hot glass articles which comprises directing jets of cooling fluid upwardly against the lower surface of such an article to cause the article to be supported by said cooling jets, rotating said article about its vertical axis in one direction while it is supported by said first named jets, and applying a fluid braking force to the rotating article to stop the rotation thereof when desired.

HUGH C. MACCONNELL, JR.

REFERENCES CITED

The following references are of record in the file of this patent:

UNITED STATES PATENTS

| Number | Name | Date |
|---|---|---|
| Re. 22,392 | Berthold | Nov. 16, 1943 |
| 2,065,862 | Long | Dec. 29, 1936 |
| 2,237,343 | Engels | Apr. 8, 1941 |
| 2,254,227 | Lewis | Sept. 2, 1941 |
| 2,375,944 | Quentin | May 15, 1945 |

FOREIGN PATENTS

| Number | Country | Date |
|---|---|---|
| 450,464 | Great Britain | July 17, 1936 |
| 833,559 | France | July 25, 1938 |